(12) United States Patent
Okamoto et al.

(10) Patent No.: US 8,998,646 B2
(45) Date of Patent: Apr. 7, 2015

(54) BATTERY CONNECTING ASSEMBLY

(75) Inventors: Ryoya Okamoto, Yokkaichi (JP); Shinichi Takase, Yokkaichi (JP); Hiroki Hirai, Yokkaichi (JP); Masakuni Kasugai, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 324 days.

(21) Appl. No.: 13/581,574

(22) PCT Filed: Mar. 1, 2011

(86) PCT No.: PCT/JP2011/054569
§ 371 (c)(1),
(2), (4) Date: Aug. 28, 2012

(87) PCT Pub. No.: WO2011/108513
PCT Pub. Date: Sep. 9, 2011

(65) Prior Publication Data
US 2013/0161053 A1  Jun. 27, 2013

(30) Foreign Application Priority Data
Mar. 3, 2010 (JP) .................................. 2010-046824

(51) Int. Cl.
*H01R 24/00* (2011.01)
*H01R 33/00* (2006.01)
(Continued)

(52) U.S. Cl.
CPC ............. *H01M 2/202* (2013.01); *H01M 2/206* (2013.01); *H01M 10/482* (2013.01); *B60L 11/1877* (2013.01); *H01M 2/1077* (2013.01); *H01M 2220/20* (2013.01)

(58) Field of Classification Search
CPC ....... H01M 2/202; H01M 2/206; H01M 2/20; H01M 10/482; H01M 2/1077; H01M 2220/20; B60L 11/1877
USPC .................................. 439/627, 500; 174/68.1
See application file for complete search history.

(56) References Cited

U.S. PATENT DOCUMENTS

| 4,934,958 | A | 6/1990 | Julian |
| 6,097,173 | A | 8/2000 | Bryant, Jr. |
| 6,275,003 | B1 | 8/2001 | Marukawa et al. |
| 2008/0305390 | A1* | 12/2008 | Naito ............................ 429/159 |

FOREIGN PATENT DOCUMENTS

| EP | A1 0450122 | 10/1991 |
| JP | A-11-067184 | 3/1999 |

(Continued)

OTHER PUBLICATIONS

Written Opinion of the International Searching Authority issued in Application No. PCT/JP2011/054569; Dated Jun. 14, 2011 (With Translation).

(Continued)

*Primary Examiner* — Javaid Nasri
(74) *Attorney, Agent, or Firm* — Oliff PLC (57) ABSTRACT

A battery connecting assembly includes: a power line having the outer circumferential portion of a conductor covered with an insulating resin and connected to electrode terminals; and a connecting units including: a connecting member that connects the adjacent electrode terminals to each other; and a wire mounting portion that mounts the power line thereon along the direction of arranging electric cells. The connecting units are coupled to each by mounting the power line on the wire mounting portion of the connecting units.

5 Claims, 9 Drawing Sheets

(51) Int. Cl.
  *H01M 2/20* (2006.01)
  *B60L 11/18* (2006.01)
  *H01M 2/10* (2006.01)
  *H01M 10/48* (2006.01)

(56) References Cited

FOREIGN PATENT DOCUMENTS

| JP | A-2001-057196 | 2/2001 |
|---|---|---|
| JP | A-2003-068272 | 3/2003 |
| JP | A-2004-098295 | 4/2004 |
| JP | A-2010-225449 | 10/2010 |
| JP | A-2011-008957 | 1/2011 |

OTHER PUBLICATIONS

International Search Report issued in Application No. PCT/JP2011/054569; Dated Jun. 14, 2011.

Dec. 1, 2014 European Search Report issued in Application No. EP 11750623.8.

* cited by examiner

BATTERY CONNECTING ASSEMBLY

TECHNICAL FIELD

The present invention relates to a battery connecting assembly.

BACKGROUND ART

A battery module for an electric car and a hybrid car includes an electric cell group in which a plurality of electric cells having positive and negative electrode terminals is arranged. The electric cells forming the electric cell group are connected in series or in parallel in which the electrode terminals of the adjacent electric cells are connected using a connecting member such as a bus bar (see Patent Document 1).

Patent Document 1: Japanese Unexamined Patent Publication No. 11-67184

In assembling the battery module in the configuration above, since it is necessary to connect the electrode terminals at a plurality of locations using the connecting member, a complicated operation is necessary to repeat an operation of connecting the connecting member between the electrode terminals.

Therefore, it is considered to form a battery connection plate in which a plurality of connecting members is arranged in a mold and a resin is poured into the mold to integrally form the connecting members by insert molding or the like according to the number of gaps between electrode terminals.

With the battery connection plate, only a single battery connection plate is mounted on a plurality of electrode terminals protruding from a plurality of electric cells to collectively connect the electrode terminals of the adjacent electric cells at a plurality of locations for improving working efficiency.

However, in the case of using a battery connection plate having connecting members integrally molded, a mold to form the battery connection plate is increased in size and the costs are increased when the number of electric cells becomes large. Moreover, in the case of changing the number of electric cells, it is necessary that a different mold having a length according to the number of electric cells be newly prepared to mold a battery connection plate having a different length, causing a cost increase in forming a mold or the like. Therefore, there is a challenge in that manufacturing costs are reduced.

For a method of solving a reduction in manufacturing costs, it can be considered that a connecting unit having a connecting member and an accommodating portion that accommodates the connecting member is prepared according to the number of gaps between electrode terminals and a connection plate having these connecting units integrally coupled to each other is mounted on an electric cell group. In this method, a mold for the connecting unit is prepared and the number of the connecting units is increased according to the number of the electric cells to be connected. Therefore, the costs of forming the mold can be reduced.

However, when the spacing between the electrode terminals of the adjacent electric cells is varied, misalignment sometimes occurs between the connecting member and the electrode terminal when mounting the connection plate in the configuration above. Particularly in the case of mounting a connection plate having connecting units firmly coupled to each other on an electric cell group, it is difficult to compensate the misalignment between the connecting member and the electrode terminal to cause a possibility to hamper smooth mounting work.

Moreover, when electric cells forming a battery module expand and contract in the direction of arranging the cells to increase a variation in the spacing between the electrode terminals, it is likely to cause a difficulty to compensate the misalignment in the connection plate in the configuration above.

Therefore, there is a need in the art to provide a battery connecting assembly configured to simplify connection work and to compensate the misalignment between a connecting member and an electrode terminal to facilitate connection work while reducing manufacturing costs.

The present invention is a battery connecting assembly that connects an electric cell group in a battery module including the electric cell group having a plurality of electric cells with a positive electrode terminal and a negative electrode terminal arranged. The battery connecting assembly includes: a power line having an outer circumferential portion of a conductor covered with an insulating resin and connected to the electrode terminal; and a plurality of connecting units including: a connecting member connecting the adjacent electrode terminals to each other; and a wire mounting portion mounting the power line thereon along a direction of arranging the electric cells. The plurality of connecting units is coupled to each other in which the power line is mounted on the wire mounting portion of the plurality of connecting units.

The battery connecting assembly according to the present invention is connected to the electric cell group as described below, for example. First, a plurality of connecting units is mounted on a single power line. In the present invention, since the connecting unit is formed with the wire mounting portion that mounts the power line thereon, the connecting units are coupled and formed in a single unit with the power line mounted on the wire mounting portion. The coupled connecting units are placed on the electric cell group having a plurality of electric cells arranged, and then the power line is disposed along the direction of arranging the electric cells. Subsequently, the connecting member is mounted on the electrode terminal to connect the battery connecting assembly to the electric cell group.

In other words, in the present invention, mounting the power line on the wire mounting portion of the connecting unit can form the connecting units in a single unit. Then, the connecting units formed in a single unit are connected to the electric cell group to connect the battery connecting assembly to the electric cell group. Thus, it is possible to simplify connection work.

When the spacing between the electrode terminals of the adjacent electric cells is varied, or when the electric cells expand and contract in the direction of arranging the cells to increase a variation in the spacing between the electrode terminals, misalignment sometimes occurs between the connecting member and the electrode terminal. However, in the present invention, since the connecting units are coupled using the power line mounted on the wire mounting portion, the connecting units are movable along the power line. Consequently, according to the present invention, it is possible to compensate the misalignment between the connecting member and the electrode terminal, and it is possible to facilitate the connection work of the battery connecting assembly.

Moreover, in the present invention, since the connecting units connect the electrode terminals to each other, the number of the connecting units maybe changed in the case of changing the number of the electric cells to be connected. Namely, in the present invention, even though the number of the electric cells to be connected is increased, it is unnecessary to prepare molds whenever the number is increased.

Consequently, according to the present invention, it is possible to reduce manufacturing costs.

According to the present invention, it is possible to provide a battery connecting assembly configured to simplify connection work and compensate the misalignment between a connecting member and an electrode terminal to facilitate connection work while reducing manufacturing costs.

EXPLANATION OF SYMBOLS 1, 40: Battery module
2, 42: Electric cell group
10: Electric cell
11A: Terminal forming surface
12A: (Positive) electrode terminal
12B: (Negative) electrode terminal
20, 50: Battery connecting assembly
21, 51: Connecting unit
21A, 51A: First connecting unit
21B, 51B: End portion connecting unit
22, 52: Connecting member
22A, 22B, 52A, 52B: Terminal insertion hole
24, 54: Connecting member accommodating portion
25, 55: Detecting line accommodating portion
26, 56: Wire mounting portion
27: Coupling member mounting portion
29: Voltage detecting line
30: Power line
31: (Flat) conductor
32: Core wire
33: Insulating resin
35: Coupling member Best Mode For Carrying Out The Invention <First Embodiment>

A first embodiment of the present invention will be described with reference to FIGS. 1 to 5.

Figure 1:
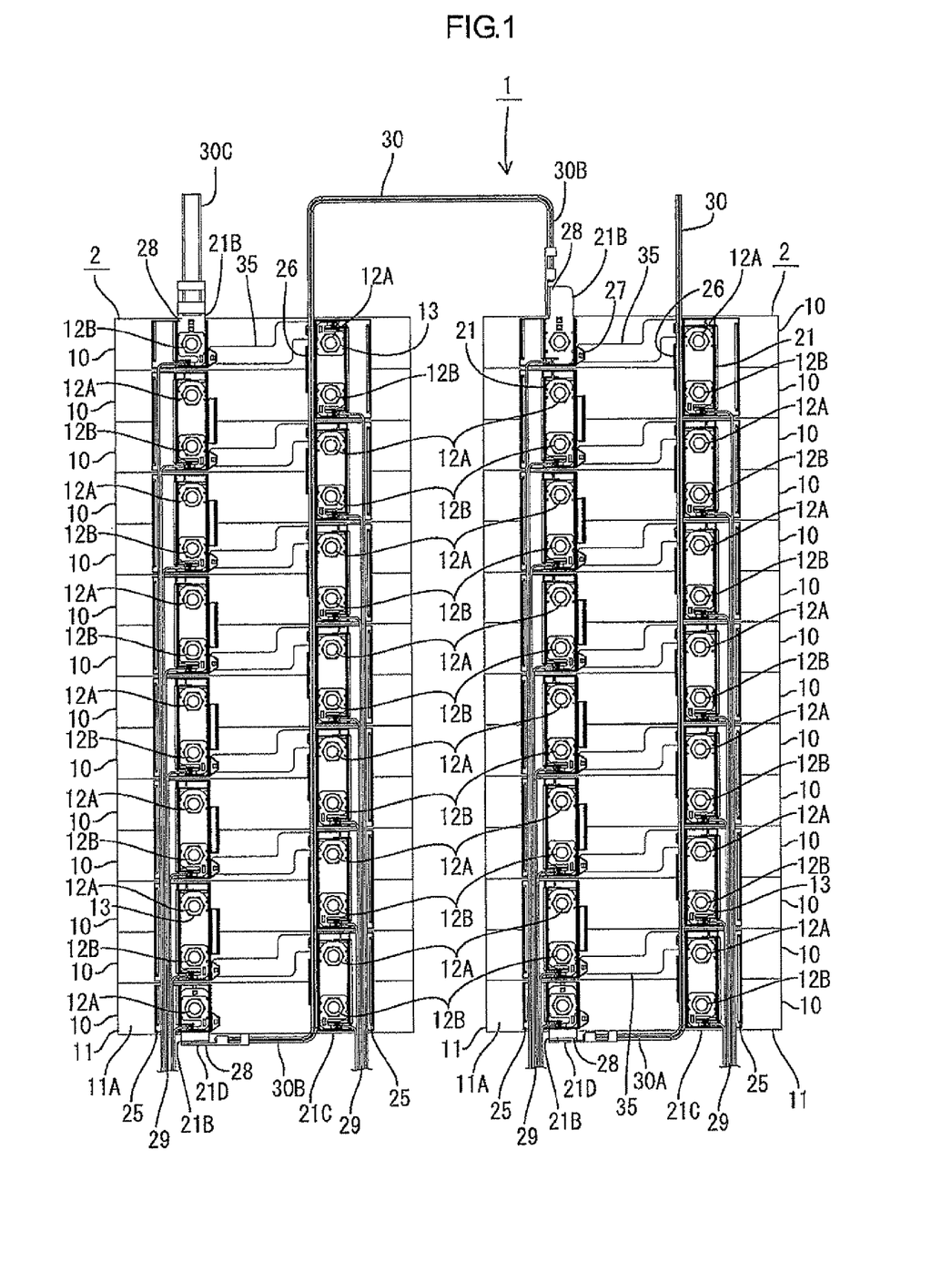
FIG. 1 is a plan view of a battery module on which a battery connecting assembly according to a first embodiment is assembled.

A battery module 1 according to the present embodiment is used for the driving source of an electric car or a hybrid car, for example, including a battery connecting assembly 20 that connects electric cell groups 2 in two lines as depicted in FIG. 1. In the following, the description will be given in which based on the lateral direction in FIG. 1, the upper side in FIG. 1 is the forward side and the lower side is the rear side.

The electric cell group 2 includes a plurality of electric cells 10 (fourteen electric cells 10) arranged in a column from the front side to the rear side. The electric cells 10 forming the electric cell group 2 include a body 11 that accommodates a power generating element, not depicted, thereinside and bolt-like electrode terminals 12A and 12B (in the drawing, a positive electrode is the electrode terminal 12A and a negative electrode is the electrode terminal 12B) protruding vertically from an end surface 11A (a terminal forming surface 11A) on the body 11.

The adjacent electrode terminals 12A and 12B of the electric cell 10 are arranged in a manner such that the polarities (positive and negative polarities) are opposite to each other. Thus, the electrode terminals 12A and 12B are arranged in a manner such that different polarities are disposed adjacent to each other. The electric cells 10 are fixed using a retainer plate, not depicted.

The battery connecting assembly 20 includes a power line 30 connected to the electrode terminals 12A and 12B of the electric cell 10 and a plurality of resin connecting units 21 on which the power line 30 is mounted.

The connecting units 21 are disposed in a column in the longitudinal direction (in the direction of arranging the electric cells 10), and arranged in two lines for a single line of the electric cell group 2. In this context, the connecting units 21 in a column disposed on the right side of the electric cell group 2 are referred to as a right unit column 21C, and the connecting units 21 in a column disposed on the left side of the electric cell group 2 are referred to as a left unit column 21D.

A resin coupling member 35 is disposed between the right unit column 21C and the left unit column 21D. The coupling member 35 has a substantially S-shape, and is mounted to couple the coupling member 35 with two connecting units 21 disposed in a direction (the lateral direction in FIG. 1) crossing the longitudinal direction (the direction of arranging the electric cells 10). A mounting protrusion 36 is provided on the end portion of the coupling member 35 to be mounted on the connecting unit 21.

The right unit column 21C is formed of seven (a plurality of) connecting units 21. Although these seven connecting units 21 forming the right unit column 21C are not joined to each other, the connecting units 21 are coupled using the power line 30 and formed in a single unit. The seven connecting units 21 forming the right unit column 21C have the same shape and the same size. In the present embodiment, the connecting units 21 are referred to as a first connecting unit 21A.

The left unit column 21D is formed of eight (a plurality of) connecting units 21. These eight connecting units 21 forming the left unit column 21D are not joined to each other, and not coupled using the power line 30. The connecting units 21B disposed at the front end and the rear end in these eight connecting units 21 forming the left unit column 21D (referred to as an end portion connecting unit 21B) are in the size almost a half of the size of the first connecting unit 21A, and connects the electrode terminals 12A and 12B disposed at the front end and the rear end to the power line 30. In the connecting units 21 forming the left unit column 21D, six connecting units 21 other than the two end portion connecting units 21B have the same shape and the same size as the first connecting unit 21A, and these connecting units 21 are also referred to as the first connecting unit 21A.

Figure 4:
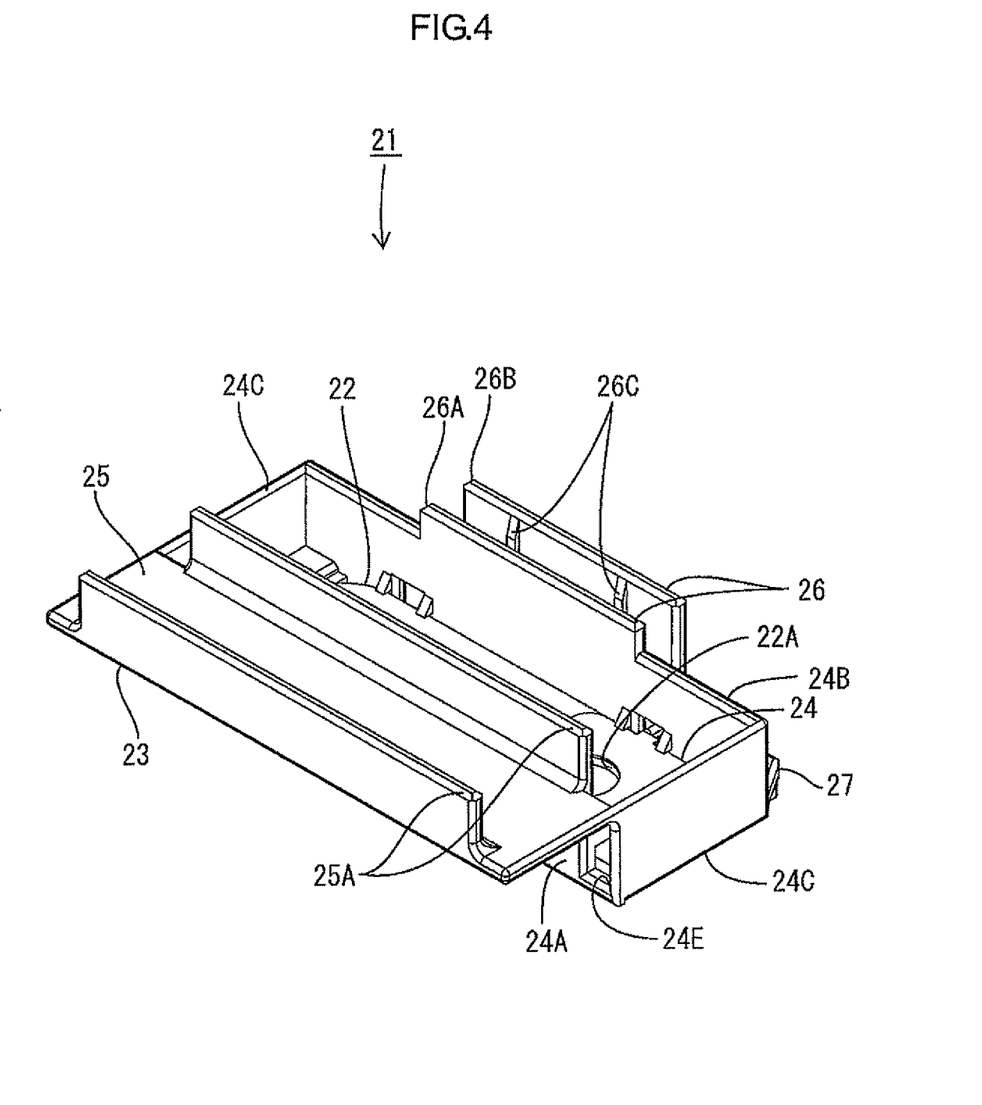
FIG. 4 is a perspective view of a connecting unit.

The first connecting unit 21A includes a connecting member 22 that has a substantially rectangular shape and electrically connects the adjacent electrode terminals 12A and 12B to each other, a voltage detecting line 29 that measures the voltage of the electric cell 10, and a base portion 23 that accommodates the connecting member 22 and the voltage detecting line 29.

The connecting member 22 is made of metal such as copper, copper alloy, and stainless steel (SUS). The connecting member 22 is formed with two terminal insertion holes 22A and 22B into which the electrode terminals 12A and 12B are inserted. The voltage detecting line 29 is connected to the connecting member 22 by welding.

Although not depicted in detail in the drawing, the voltage detecting line 29 is a cladded wire with a conductor (a core wire) is covered with an insulating layer, in which the insulating layer is stripped to expose the core wire at the terminal of the voltage detecting line 29 (the connecting portion to the connecting member 22). The voltage detecting lines 29 are gathered in the detecting line accommodating portion 25, and connected to a battery ECU, not depicted. This battery ECU is a device having a microcomputer, a device, or the like mounted thereon, in the known configuration having a function to detect the voltage, electric current, and temperature of the electric cell 10 and controls the charging and discharging of the electric cell 10, for example.

The base portion 23 is made of a synthetic resin, and placed across the adjacent electric cells 10 as depicted in FIG. 1. The base portion 23 includes a connecting member accommodating portion 24 that accommodates the connecting member 22, a detecting line accommodating portion 25 provided as sandwiching the connecting member accommodating portion 24, and a wire mounting portion 26. The connecting member accommodating portion 24, the detecting line accommodating portion 25, and the wire mounting portion 26 are formed by integrally molding a synthetic resin.

The connecting member accommodating portion 24 has a rectangular region surrounded by side walls 24A, 24B, and 24C, which accommodates the connecting member 22. The connecting member 22 is accommodated in the connecting member accommodating portion 24 to hold the connecting member 22.

The dimension of the connecting member accommodating portion 24 in the longitudinal direction is slightly smaller than the dimension of two electric cells 10 in the crosswise direction. Therefore, a slight gap is provided between the connecting units 21 in arranging the connecting units 21.

The height of the side walls 24A and 24B formed on the connecting member accommodating portion 24 in the longitudinal direction is higher than the height of the side wall 24C formed in the crosswise direction. In the side walls 24A and 24B formed in the longitudinal direction, the side wall 24A on the near side in FIG. 4 has a function to protect the voltage detecting line 29 as a part of the detecting line accommodating portion 25. The side wall 24B on the back side in FIG. 4 has a function to clamp the power line 30 as a part of the wire mounting portion 26.

Figure 3:
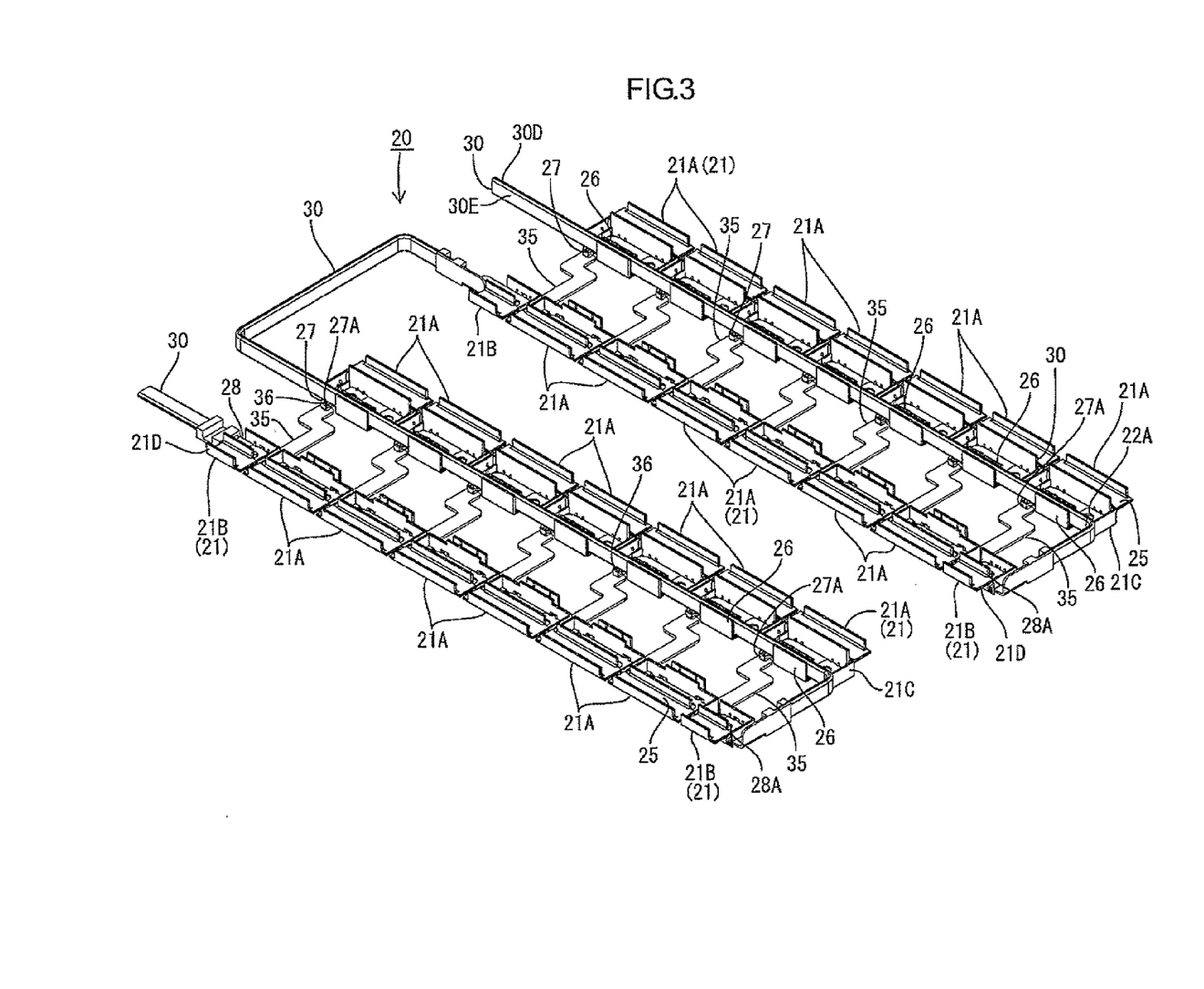
FIG. 3 is a perspective view of the battery connecting assembly.

A detecting line insertion hole 24E is provided at the lower end portion of the side wall 24A of the connecting member accommodating portion 24, into which the voltage detecting line 29 is inserted. A coupling member mounting portion 27 protrudes at the side wall 24B of the connecting member accommodating portion 24 to mount the coupling member 35 thereon. It is noted that as depicted in FIG. 3, the coupling member mounting portion 27 is formed with a mounting hole 27A to which the mounting protrusion 36 provided on the coupling member 35 is fit.

As depicted in FIG. 4, the detecting line accommodating portion 25 is formed at a location continuing to the top end surface of the side wall 24C of the connecting member accommodating portion 24 in the crosswise direction, and a protection wall 25A is formed on both sides of the detecting line accommodating portion 25 in the crosswise direction to protect the voltage detecting line 29.

As depicted in FIG. 4, the wire mounting portion 26 is formed of the side wall 24B on the back side of the connecting member accommodating portion 24 and a portion 26B (a clamping part 26B) formed at substantially the same height of a portion 26A that continues from this side wall 243 and is a higher portion of the side wall 243. The power line 30 is mounted as sandwiched between the side wall 24B (26A) and the clamping part 263. Two ribs 26C and 26C are provided on the inner side of the clamping part 263 so as to prevent the power line 30 from going to the upper side.

The end portion connecting unit 21B is different from the first connecting unit 21A in that the end portion connecting unit 218 includes a wire connecting member 28 that electrically connects the electrode terminals 12A and 12B at the end portions to the power line 30, instead of the connecting member 22 connecting two electrode terminals 12A and 12B to each other and that the wire mounting portion 26 is not provided. The wire connecting member 28 is formed with one terminal insertion hole 28A, into which the electrode terminals 12A and 12B at the end portions are inserted.

The wire connecting member 28 of the end portion connecting unit 21B disposed at the rear end (the lower side in FIG. 1) is vertically bent in the direction of the right unit column 21C, and connected to the power line 30. The other configurations of the end portion connecting unit 21B are almost the same as the first connecting unit 21A.

Figure 2:
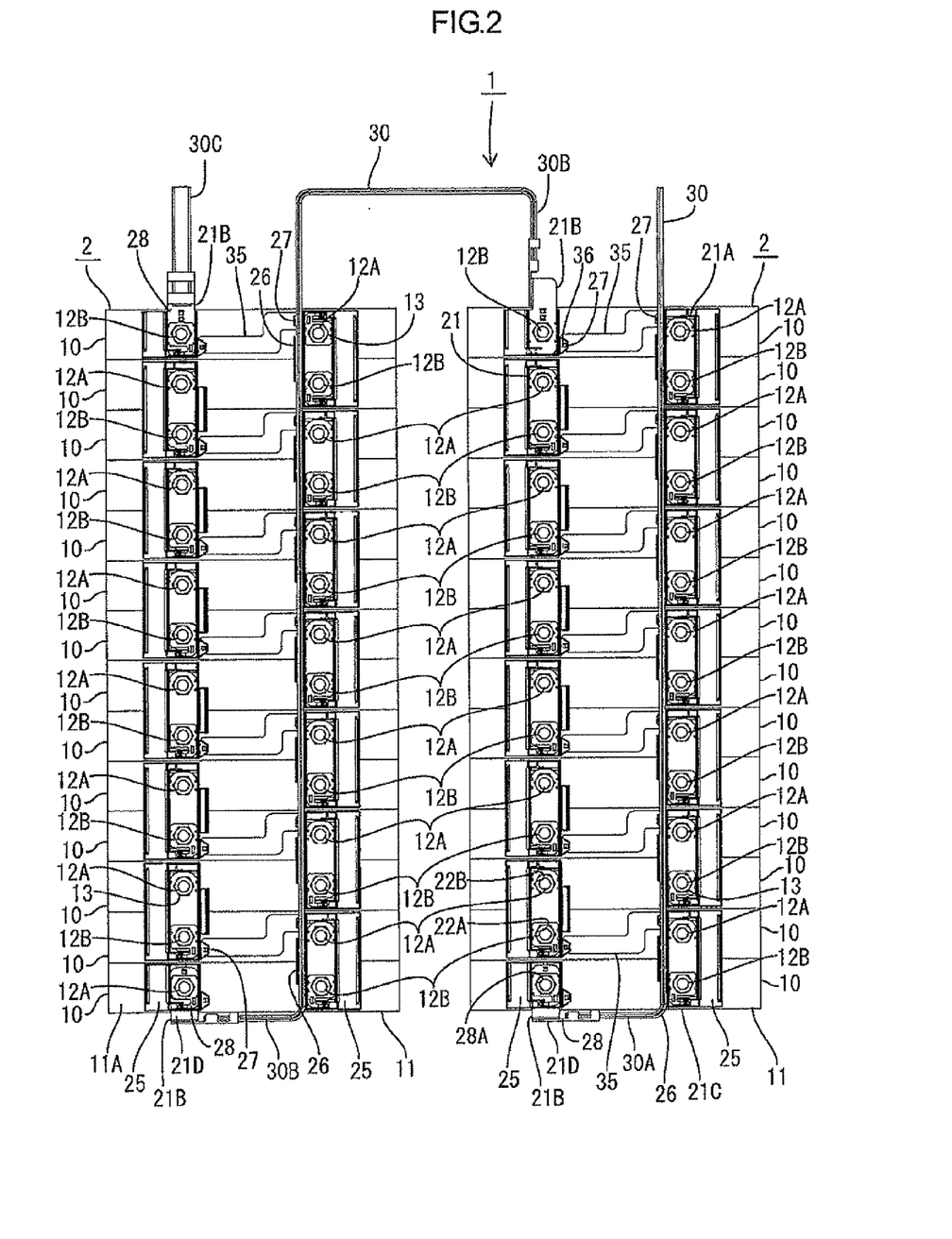
FIG. 2 is a plan view of a battery module on which no voltage detecting line is mounted.

As depicted in FIGS. 1 and 2, the power line 30 mounted on the connecting unit 21 extends in the direction of arranging the electric cells 10 (in the vertical direction in FIG. 1), and couples the first connecting units 21 forming the right unit column 21C of the electric cell group 2.

Figure 5:
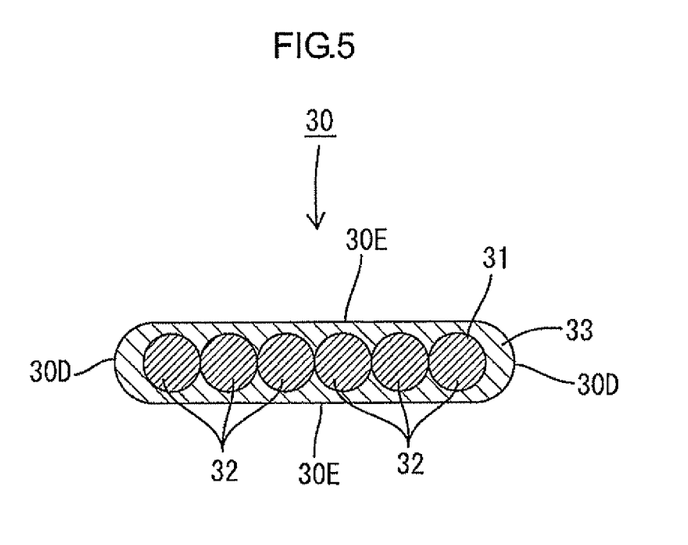
FIG. 5 is a cross sectional view of a power line.

As depicted in FIG. 5, the power line 30 is formed by covering the outer circumference of a conductor 31 with an insulating resin 32. At the end portion of the power line 30, the wire connecting member 28 is connected to the exposed conductor 31. In the present embodiment, the conductor 31 is the flat conductor 31 having a plurality of core wires 32 arranged in parallel with each other in the lateral direction in FIG. 5. In the present embodiment, the core wire 32 is a stranded wire formed of a plurality of fine metal lines (not depicted) stranded with each other. For the fine metal line, given metal such as copper, copper alloy, aluminum, and aluminum alloy can be used, as necessary. In the present embodiment, the core wires 32 are arranged in a line in the lateral direction. However, the core wires 32 may be arranged in a plurality of stages in the vertical direction, not limited to the one-line arrangement.

The power line 30 according to the present embodiment is a flat cable formed of the flat conductor 31 covered with the insulating resin 33 in a flat shape. In the present embodiment, the power line 30 is mounted on the wire mounting portion 26 of the connecting unit 21 in which surfaces 30D in the thickness direction (right and left surfaces 30D in FIG. 5) face the terminal forming surface 11A of the electric cell 10. The power line 30 is arranged in a manner such that the power line 30 is bent almost vertically as a flat surface 30E is provided on the inner side at a location between the adjacent unit columns 21C and 21D.

The front end portion of the power line 30 (referred to as a first power line 30A) mounted on the right unit column 21C of the electric cell group 2 on the right side in FIG. 1 (the right electric cell group 2) is connectable to a counter terminal, not depicted. The rear end portion of the first power line 30A is connected to the wire connecting member 28 of the end portion connecting unit 21B at the rear end of the left unit column 21D.

One end portion of the power line 30 (referred to as a second power line 30B) mounted on the electric cell group 2 on the left side in FIG. 1 (the left electric cell group 2) is connected to the wire connecting member 28 of the end portion connecting unit 213 at the front end of the right electric cell group 2. The power line 30 is bent in a substantially U-shape between the right electric cell group 2 and the left electric cell group 2, and mounted on the right unit column 21C of the left electric cell group 2. The other end portion of the second power line 30B is bent in an L-shape at the rear end of the left electric cell group 2, and connected to the wire connecting member 28 of the end portion connecting unit 213 at the rear end of the left unit column 21D. The end portion of the power line 30 (referred to as a third power line 30C) is connected to the end portion connecting unit 21B at the front end of the left unit column 21D of the left electric cell group 2.

Next, a method of assembling and mounting the battery connecting assembly 20 according to the present embodiment will be described. In the present embodiment, as depicted in FIG. 1, the configuration will be described where fourteen electric cells 10 are connected in two lines in series.

Twenty-eight electric cells 10 are prepared, and fourteen electric cells 10 are arranged with the terminal forming surface 11A thereof on the upper side to prepare two lines of the electric cell groups 2.

In one line of the electric cell group 2, seven first connecting units 21A are mounted on the electrode terminals 12A and 12B arranged on the right side, and two end portion connecting units 21B and six first connecting units 21A are mounted on the electrode terminals 12A and 12B arranged on the left side. Therefore, twenty-six first connecting units 21A and four end portion connecting units 21B are prepared.

Subsequently, seven first connecting units 21A are arranged in the vertical direction in the same orientation, the power line 30 is mounted on the wire mounting portion 26 of the first connecting unit 21A, and then the right unit column 21C having seven first connecting units 21A coupled with each other is obtained. Two sets of the right unit columns 21C are prepared.

Subsequently, the front end portion connecting unit 21B and six first connecting units 21A are arranged in the vertical direction, and the connecting units 21A and 21B and the connecting units 21 forming the right unit column 21C are coupled to each other and formed in a single unit by mounting the coupling member 35. The coupling member 35 can be mounted by fitting the mounting protrusion 36 of the coupling member 35 into the mounting hole 27A of the connecting unit 21. Two sets of the connecting units 21 formed in a single unit are prepared.

The connecting units 21 formed in a single unit is disposed on the top surface of the electric cell group 2 in which the terminal insertion holes 22A and 22B of the connecting member 22 correspond to the electrode terminals 12A and 12B, and then the power line 30 mounted on the connecting unit 21 is arranged along the direction of arranging the electric cells 10 (see FIG. 2). The end portion connecting unit 21B at the rear end is disposed at the same time or before or after the connecting unit 21 formed in a single unit is disposed on the electric cell group 2.

Subsequently, the first power line 30 and the second power line 30 are arranged to be bent in a predetermined shape, and connected to the wire connecting member 28 of a predetermined end portion connecting unit 21B.

Subsequently, the voltage detecting line 29 is individually connected to the connecting units 21, and the connected voltage detecting line 29 is inserted into the detecting line insertion hole 24E and lead to the side of the detecting line accommodating portion 25. The voltage detecting line 29 lead to the side of the detecting line accommodating portion 25 is disposed in the detecting line accommodating portion 25.

Subsequently, a nut 13 is screwed and fastened to the electrode terminals 12A and 12B inserted into the terminal insertion holes 22A and 22B to connect the electrode terminals 12A and 12B to the connecting member 22, and a nut 13 is screwed and fastened to the electrode terminals 12A and 12B inserted into the terminal insertion hole 28A to connect the electrode terminals 12A and 12B to the wire connecting member 28. After completing this connection work, the battery connecting assembly 20 according to the present embodiment is connected to the electric cell group 2, and the battery module 1 is completed.

Next, the operation and the effect of the present embodiment will be described.

According to the present embodiment, mounting the power line 30 on the wire mounting portion 26 of the connecting unit 21 can couple and form the connecting units 21 in a single unit. Then, the connecting units 21 formed in a single unit are connected to the electric cell group 2 to connect the battery connecting assembly 20 to the electric cell group 2. Thus, it is possible to simplify the connection work.

When the spacing between the adjacent electrode terminals 12A and 12B of the electric cell 10 is varied, or when the electric cells 10 expand and contract in the direction of arranging the cells to increase a variation in the spacing between the electrode terminals 12A and 12B, misalignment sometimes occurs between the connecting member 22 and the electrode terminals 12A and 12B.

However, in the present embodiment, since the connecting units 21 (the first connecting units 21A) forming the right unit column 21C are coupled using the power line 30 mounted on the wire mounting portion 26, the connecting units 21 are movable along the power line 30. Moreover, the connecting units 21 (the first connecting units 21A and the end portion connecting unit 21B) forming the left unit column 21D are not joined to each other. Therefore, according to the present embodiment, even though misalignment occurs between the connecting member 22 and the electrode terminals 12A and 12B as described above, it is possible to compensate the misalignment, and it is possible to facilitate the connection work of the battery connecting assembly 20.

Furthermore, in the present embodiment, since the connecting units 21 connect the electrode terminals 12A and 12B to each other, the number of the connecting units 21 may be changed in the case of changing the number of the electric cells 10 to be connected. Namely, in the present embodiment, molds for the first connecting unit 21A and the end portion connecting unit 21B may be prepared to use the connecting units 21A and 21B prepared using the molds. Therefore, even though the number of the electric cells 10 to be connected is increased, it is unnecessary to prepare molds whenever the number is increased. Consequently, according to the present embodiment, it is possible to reduce manufacturing costs.

Moreover, according to the present embodiment, the power line 30 is a flat cable having a flat conductor 31. The flat cable is formed by covering the outer circumferential portion of the flat conductor 31 with the insulating resin 33 in a flat shape. The flat conductor 31 is formed of the core wires 32 contacted and arranged in parallel with each other. Thus, power transmission ability is excellent, and heat dissipation property is excellent because the area to contact with the outside air is large.

The flat cable 30 used as the power line 30 in the present embodiment can be easily bent in the flat surface 30E. However, it is difficult to bend the flat cable 30 as the surface 30D in the thickness direction is disposed on the inner side. In the present embodiment, the power line 30 is mounted in a manner such that the surface 30D of the flat cable 30 in the thickness direction corresponds to the terminal forming surface 11A. Thus, it is possible to increase stiffness in the vertical direction (in the direction vertical to the terminal forming surface 11A). Furthermore, in the present embodiment, since the flat surface 30E of the flat cable 30, which is easily bent, is bent to arrange the power line 30, the arrangement of the power line 30 is facilitated.

Moreover, according to the present embodiment, the coupling member 35 is provided to couple two connecting units 21 disposed in the direction crossing the direction of arranging the electric cells 10. Therefore, in the present embodiment, the connecting units 21 forming the right unit column 21C in a single unit with the power line 30 mounted are coupled to the connecting units 21 forming the left unit column 21D by mounting the coupling member 35. Thus, the right unit column 21C and the left unit column 21D can be formed in a single unit. Consequently, according to the present embodiment, it is possible to facilitate forming the right unit column 21C coupled using the power line 30 and the left unit column 21D not coupled using the power line 30 in a single unit.

Furthermore, according to the present embodiment, since the connecting unit 21 is provided with the detecting line accommodating portion 25 that accommodates the voltage detecting line 29 connected to the connecting member 22, it is possible to facilitate the arrangement of the voltage detecting line 29.

<Second Embodiment>

Next, a second embodiment of the present invention will be described with reference to FIGS. 6 to 9.

Figure 6:
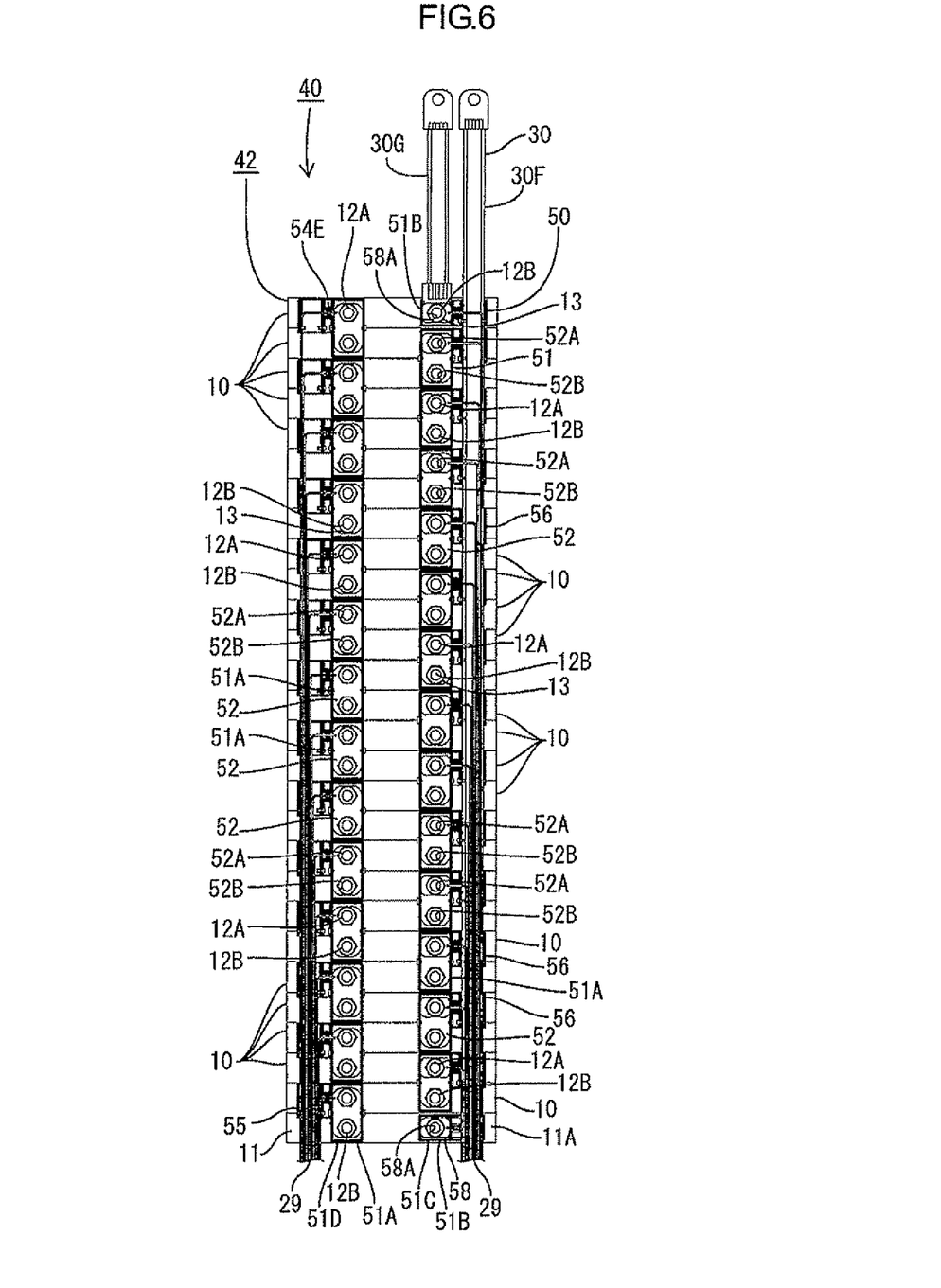
FIG. 6 is a plan view of a battery module on which a battery connecting assembly according to a second embodiment is assembled.

The present embodiment is different from the first embodiment in that a flat surface 30E of a power line 30 is arranged so as to correspond to a terminal forming surface 11A and that no coupling member 35 is provided, for example (see FIG. 6). Portions similarly configured as in the first embodiment are designated the same reference numerals and signs, and the overlapping description is omitted.

A battery connected module 40 according to the present embodiment includes a battery connecting assembly 50 that connects an electric cell group 42 in a line having a plurality of (twenty-eight) electric cells 10 arranged in a column from the front side to the rear side. In the following, the description will be given in which based on the lateral direction in FIG. 6, the upper side in FIG. 6 is the forward side and the lower side is the rear side.

Figure 7:
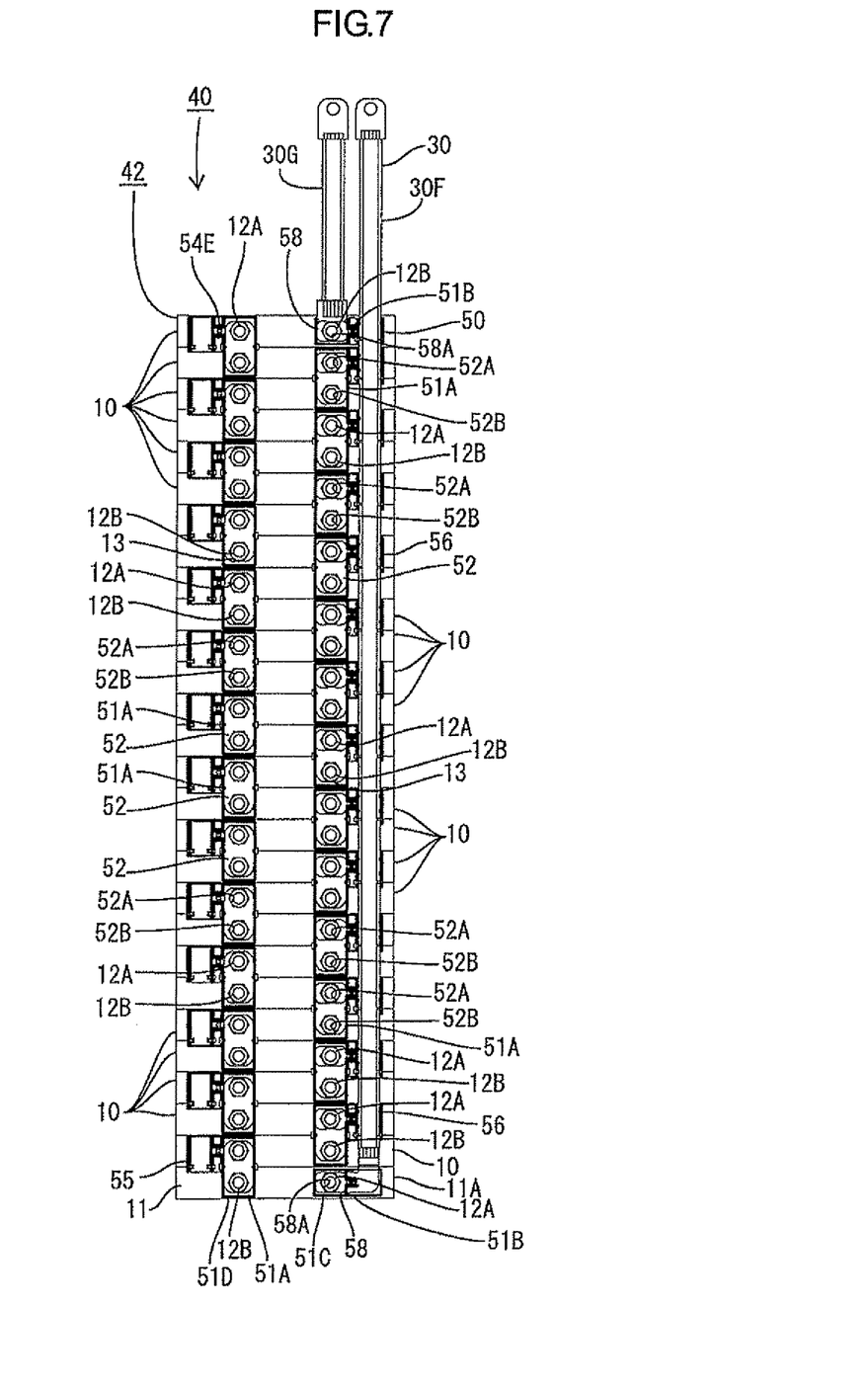
FIG. 7 is a plan view of a battery module on which no voltage detecting line is mounted.
Figure 8:
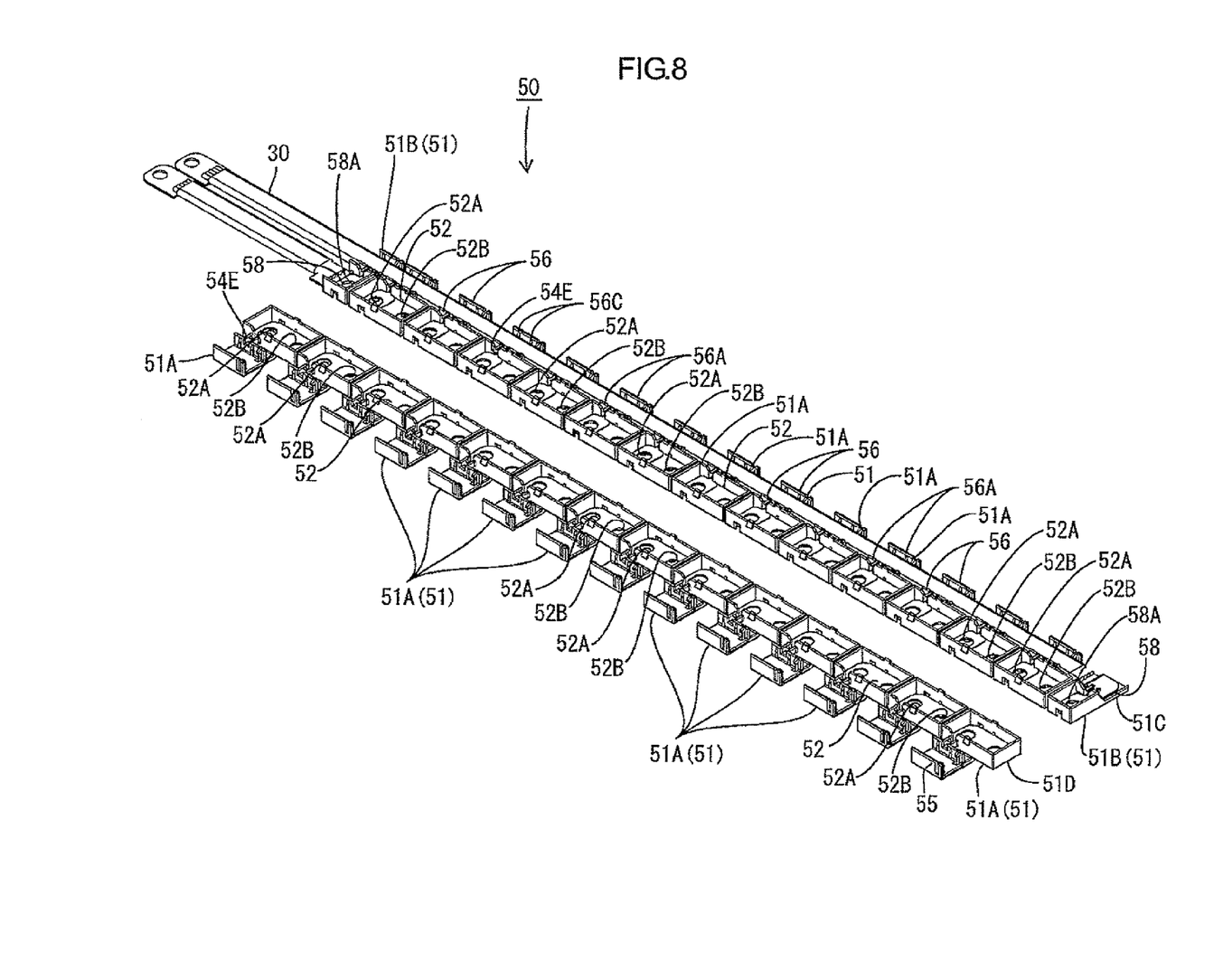
FIG. 8 is a perspective view of the battery connecting assembly.

As depicted in FIG. 7, the battery connecting assembly 50 includes a power line 30 connected to electrode terminals 12A and 12B of the electric cell 10 and a plurality of connecting units 51.

The connecting units 51 are disposed in a column in the longitudinal direction (in the direction of arranging the electric cells 10). In this context, the connecting units 51 in a column disposed on the right side of the electric cell group 42 are referred to as a right unit column 51C, and the connecting units 51 in a column disposed on the left side of the electric cell group 42 are referred to as a left unit column 51D.

The right unit column 51C is formed of fifteen (a plurality of) connecting units 51. The connecting units 51 forming the right unit column 51C are not joined to each other. However, the connecting units 51 are coupled using the power line 30, and formed in a single unit.

In the connecting units 51 forming the right unit column 51C, the connecting units 51 disposed at the front end and the rear end (referred to as end portion connecting units 51B) are in the size almost a half of the size of another connecting unit 51A, and connect the electrode terminals 12A and 12B disposed at the front end and the rear end to the power line 30. In the connecting units 51 forming the right unit column 51C, thirteen connecting units 51A other than two end portion connecting units 51B have the same shape and the same size. In the present embodiment, the connecting units 51A are referred to as first connecting units 51A.

The left unit column 51D is formed of fourteen (a plurality of) connecting units 51. The connecting units 51 forming the left unit column 51D are not joined to each other, and not coupled using the power line 30. The connecting units 51 forming the left unit column 51D have the same shape and the same size as the first connecting units 51A forming the right unit column 51C (also referred to as the first connecting units 51A).

The first connecting unit 51A includes a connecting member 52 that has a substantially rectangular shape and electrically connects the adjacent electrode terminals 12A and 12B to each other, a voltage detecting line 29 that measures the voltage of the electric cell 10, and a base portion 53 that accommodates the connecting member 52 and the voltage detecting line 29.

Figure 9:
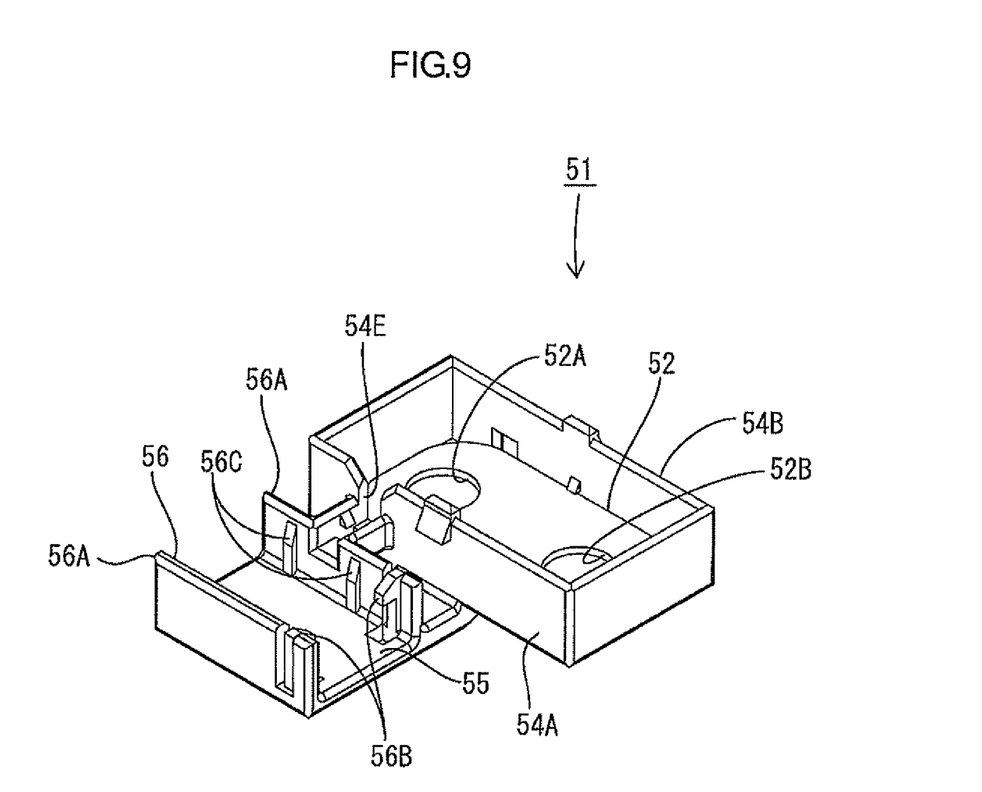
FIG. 9 is a perspective view of a connecting unit.

As depicted in FIG. 9, the base portion 53 includes a connecting member accommodating portion 54 that accommodates the connecting member 52 and a wire mounting portion 56 that mounts the power line 30 thereon. The connecting member accommodating portion 54 and the wire mounting portion 56 are formed by integrally molding a synthetic resin.

The connecting member accommodating portion 54 has a rectangular region surrounded by wall portions, which accommodates the connecting member 52, and a side wall 54A of the connecting member accommodating portion 54 in the longitudinal direction is provided with a detecting line insertion groove 54E that leads the voltage detecting line 29 connected to the connecting member 52. The detecting line insertion groove 54E is provided so as to connect the connecting member accommodating portion 54 to the wire mounting portion 56, and the voltage detecting line 29 lead from the detecting line insertion groove 54E is disposed on the power line 30 mounted on the wire mounting portion 56 (see FIG. 6). In the present embodiment, the wire mounting portion 56 also includes a function as the detecting line accommodating portion 25.

The wire mounting portion 56 provided on the near side in FIG. 9 is formed of a pair of clamping parts 56A and 56A to hold the power line 30 in the crosswise direction, and the power line 30 is mounted as sandwiched between the clamping parts 56A and 56A. Inner side of the pair of the clamping parts 56A and 56A, a rib 56C that holds the power line 30 to prevent the power line 30 from going off to the length direction and a pair of retaining projections 56B and 56B that retain the power line 30 so as not to go off to the upper side are provided.

The end portion connecting unit 51B is different from the first connecting unit 51A in that the end portion connecting unit 51B includes a wire connecting member 58 that electrically connects the electrode terminals 12A and 12B at the end portions to the power line 30 instead of the connecting member 52. The wire connecting member 58 is formed with one terminal insertion hole 58A into which the electrode terminals 12A and 12B at the end portions are inserted. The other configurations are almost the same as the first connecting unit 51A.

As depicted in FIGS. 6 and 7, the power line 30 mounted on the connecting unit 51 extends in the direction of arranging the electric cells 10 (in the vertical direction in FIG. 6) to couple the connecting units 51 (the first connecting unit 51A and the end portion connecting unit 51B) forming the right unit column 51D of the electric cell group 42.

In the present embodiment, the power line 30 is a flat cable similarly configured as the power line 30 described in the first embodiment, and the power line 30 is mounted on the wire mounting portion 56 of the connecting unit 51 in a manner such that the flat surface 30E corresponds to the terminal forming surface 11A of the electric cell 10.

The front end portion of the power line 30 forming the right unit column 51C in a single unit (referred to as a fourth power line 30F) is connectable to a counter terminal, not depicted, and the rear end portion of the fourth power line 30F is connected to the wire connecting member 58 of the end portion connecting unit 51B at the rear end of the right unit column 51C.

The power line 30 connected to the end portion connecting unit 51B of the right unit column 51C (referred to as a fifth power line 30G) is connectable to a counter terminal, not depicted.

Next, a method of assembling and mounting the battery connecting assembly 50 according to the present embodiment will be described. In the present embodiment, as depicted in FIG. 6, the case will be described where twenty-eight electric cells 10 are connected in a line in series.

Twenty-eight electric cells 10 are prepared, and the electric cells 10 are arranged with the terminal forming surface 11A on the upper side to prepare the electric cell group 42 in a line.

Two end portion connecting units 51B and thirteen first connecting units 51A are mounted on the electrode terminals 12A and 12B arranged on the right side of the electric cell group 42, and fourteen first connecting units 51A are mounted on the electrode terminals 12A and 12B arranged on the left side of the electric cell group 42. Therefore, twenty-seven first connecting units 51A and two end portion connecting units 51B are prepared.

Subsequently, the connecting units 51 are arranged in the vertical direction so as to arrange thirteen first connecting units 51A between two end portion connecting units 51B, the fourth power line 30F is mounted on the wire mounting portion 56 of the front end portion connecting unit 51B and the wire mounting portion 56 of the first connecting unit 51A, and then one end portion connecting unit 51B is coupled to the thirteen first connecting units 51A. Subsequently, the end portion of the fourth power line 30F is connected to the wire connecting member 58 of the end portion connecting unit 51B at the rear end, the fifth power line 30G is connected to the wire connecting member 58 of the end portion connecting unit 51B at the front end, and then the right unit column 51C is obtained. The right unit column 51C is disposed on the top surface of the electric cell group 42 with terminal insertion holes 52A and 52B of the connecting member 52 corresponded to the electrode terminals 12A and 12B, and then the fourth power line 30F mounted on the connecting unit 51 is arranged along the direction of arranging the electric cells 10 (see FIG. 7).

Subsequently, the voltage detecting line 29 is individually connected to the connecting units 51, and the connected voltage detecting line 29 is lead from the detecting line insertion groove 54E to the wire mounting portion 56. The voltage detecting line 29 lead to the wire mounting portion 56 is disposed on the power line 30.

Subsequently, fourteen first connecting units 51A are disposed on the electrode terminals 12A and 12B arranged on the left side of the electric cell group 42, the voltage detecting line 29 is individually connected to the connecting units 51, and the connected voltage detecting line 29 is lead from the wire insertion groove 54E to the wire mounting portion 56. The voltage detecting line 29 lead to the wire mounting portion 56 is disposed on the wire mounting portion 56.

Subsequently, a nut 13 is screwed and fastened to the electrode terminals 12A and 12B inserted into the terminal insertion holes 52A and 52B to connect the electrode terminals 12A and 12B to the connecting member 52. A nut 13 is screwed and fastened to the electrode terminals 12A and 12B inserted into the terminal insertion hole 58A to connect the electrode terminals 12A and 12B to the wire connecting member 58. After completing this connection work, the battery connecting assembly 50 according to the present embodiment is connected to the electric cell group 42, and the battery module 40 is completed.

Next, the operation and effect of the present embodiment will be described.

According to the present embodiment, as similar to the first embodiment, mounting the power line 30 on the wire mounting portion 56 of the connecting unit 51 can couple and form the connecting units 51 (the first connecting unit 51A and the end portion connecting unit 51B) in a single unit. Then, the connecting units 51 formed in a single unit are connected to the electric cell group 42 to connect the battery connecting assembly 50 to the electric cell group 42. Thus, it is possible to simplify connection work.

Moreover, in the present embodiment, the connecting units 51 are coupled using the power line 30 through the wire mounting portion 56, and the connecting units 51 are movable along the power line 30. Thus, it is possible to compensate the misalignment between the connecting member 52 and the electrode terminals 12A and 12B. Consequently, it is possible to facilitate connection work.

Furthermore, in the present embodiment, since the connecting units 51 connect the electrode terminals 12A and 12B to each other, the number of the connecting units 51 may be changed in the case of changing the number of the electric cells 10 to be connected. Namely, in the present embodiment, molds for the first connecting unit 51A and the end portion connecting unit 51B may be prepared to use the connecting units 51A and 51B prepared using the molds. Thus, even though the number of the electric cells 10 to be connected is increased, it is unnecessary to prepare molds whenever the number is increased. Consequently, according to the present embodiment, it is possible to reduce manufacturing costs.

Moreover, according to the present embodiment, since the power line 30 is a flat cable, power transmission ability is excellent, and heat dissipation property is excellent because the area to contact with the outside air is large.

Furthermore, according to the present embodiment, since the connecting unit 51 also includes a function that the wire mounting portion 56 accommodates the voltage detecting line 29, it is possible to simplify the structure of the connecting unit 51.

<Other Embodiments>

The present invention is not limited to the embodiments described with reference to the description above and the drawings. For example, the following embodiments are also included in the technical scope of the present invention.

(1) In the aforementioned embodiments, a flat cable is shown as the power line. However, the power line may be a power line in a substantially circular shape in the cross sectional form, for example.

(2) In the aforementioned embodiments, the battery module using twenty-eight electric cells is depicted. However, the number of the electric cells may be any numbers as long as the number is two or more.

It is noted that according to the present invention, since the battery connecting assembly is formed of a plurality of connecting units, the battery connecting assembly can cope with also in the case of changing the number of the electric cells to be connected when the number of the connecting units is changed. Thus, the battery connecting assembly is applicable to various types of battery modules. Consequently, it is possible to reduce manufacturing costs.

(3) In the aforementioned embodiments, the electric cell group in a line and the electric cell group in two lines are shown as the electric cell group. However, the electric cell group may have three columns or more.

The disclosed technique is a battery connecting assembly that connects an electric cell group in a battery module including the electric cell group having a plurality of electric cells with a positive electrode terminal and a negative electrode terminal arranged. The battery connecting assembly includes: a power line having an outer circumferential portion of a conductor covered with an insulating resin and connected to the electrode terminal; and a plurality of connecting units including: a connecting member that connects the adjacent electrode terminals to each other; and a wire mounting portion that mounts the power line thereon along a direction of arranging the electric cells. The plurality of connecting units is coupled to each other by mounting the power line on the wire mounting portion of the plurality of connecting units.

The battery connecting assembly according to this technique is connected to the electric cell group as described below, for example. First, a plurality of connecting units is mounted on a single power line. In this technique, since the connecting unit is formed with the wire mounting portion that mounts the power line thereon, the connecting units are coupled and formed in a single unit with the power line mounted on the wire mounting portion. The coupled connecting units are placed on the electric cell group having a plurality of electric cells arranged, and then the power line is disposed along the direction of arranging the electric cells. Subsequently, the connecting member is mounted on the electrode terminal to connect the battery connecting assembly to the electric cell group.

In other words, in this technique, mounting the power line on the wire mounting portion of the connecting unit can form the connecting units in a single unit. Then, the connecting units formed in a single unit are connected to the electric cell group to connect the battery connecting assembly to the electric cell group. Thus, it is possible to simplify connection work.

When the spacing between the electrode terminals of the adjacent electric cells is varied, or when the electric cells expand and contract in the direction of arranging the cells to increase a variation in the spacing between the electrode terminals, misalignment sometimes occurs between the connecting member and the electrode terminal. However, in this technique, since the connecting units are coupled using the power line mounted on the wire mounting portion, the connecting units are movable along the power line. Consequently, according to this technique, it is possible to compensate the misalignment between the connecting member and the electrode terminal, and it is possible to facilitate the connection work of the battery connecting assembly.

Moreover, in this technique, since the connecting units connect the electrode terminals to each other, the number of the connecting units may be changed in the case of changing the number of the electric cells to be connected. Namely, in this technique, even though the number of the electric cells to be connected is increased, it is unnecessary to prepare molds whenever the number is increased. Consequently, according to this technique, it is possible to reduce manufacturing costs.

This technique may include the following configuration.

The power line may be a flat cable having a flat conductor includes a plurality of core wires contacted and arranged in parallel with each other, the flat cable formed by covering an outer circumferential portion of the flat conductor with an insulating resin in a flat shape.

With this configuration, the flat cable is preferable due to excellent power transmission ability and excellent heat dissipation property because the area to contact with the outside air is large. Moreover, with this configuration, since the power line is in a flat shape, it is possible to facilitate the arrangement of the power line because bending the power line is easy.

The power line may be the flat cable, and may be mounted on the wire mounting portion in a manner such that a surface of the flat cable in a thickness direction is disposed so as to correspond to a terminal forming surface on which the electrode terminal of the electric cell is formed.

It is difficult to bend the flat cable with the surface in the thickness direction is disposed on the inner side. Thus, with this configuration, it is possible to increase stiffness in the direction vertical to the terminal forming surface of the electric cell.

The battery connecting assembly may include a coupling member that couples two of the connecting units disposed in a direction crossing the direction of arranging the electric cells.

For example, in the case where the connecting units are connected in two lines along the direction of arranging the electric cells as depicted in FIG. 1, the configuration as described above enables the connecting units in two lines to be formed in a single unit by mounting the power line individually on the connecting units to form one column of the connecting units in a single unit and by mounting the coupling member on one column of the connecting units and on the other column of the connecting units to couple the connecting units to each other.

The connecting unit maybe provided with a detecting line accommodating portion that accommodates a voltage detecting line connected to the connecting member. With this configuration, it is possible to facilitate the arrangement of the voltage detecting line.

The invention claimed is:

1. A battery connecting assembly that connects an electric cell group in a battery module including the electric cell group having a plurality of electric cells with a positive electrode terminal and a negative electrode terminal arranged, the battery connecting assembly comprising:
    a power line having an outer circumferential portion of a conductor covered with an insulating resin and connected to the electrode terminal;
    a plurality of connecting units including a connecting member that connects the adjacent electrode terminals to each other and a wire mounting portion that mounts the power line thereon along a direction of arranging the electric cells; wherein the plurality of connecting units are coupled to each other by mounting the power line on the wire mounting portion of the plurality of connecting units; and
    an end portion connecting unit including a wire connecting member electrically connected to the power line.

2. The battery connecting assembly according to claim 1, wherein the power line is a flat cable having a flat conductor including a plurality of core wires contacted and arranged in parallel with each other, the flat cable formed by covering an outer circumferential portion of the flat conductor with an insulating resin in a flat shape.

3. The battery connecting assembly according to claim 2, wherein the power line is the flat cable, and mounted on the wire mounting portion in a manner such that a surface of the flat cable in a thickness direction is disposed so as to correspond to a terminal forming surface on which the electrode terminal of the electric cell is formed.

4. The battery connecting assembly according to claim 1, further comprising a coupling member that couples two of the connecting units disposed in a direction crossing the direction of arranging the electric cells.

5. The battery connecting assembly according to claim 1, wherein the connecting unit is provided with a detecting line accommodating portion that accommodates a voltage detecting line connected to the connecting member.

* * * * *